UNITED STATES PATENT OFFICE.

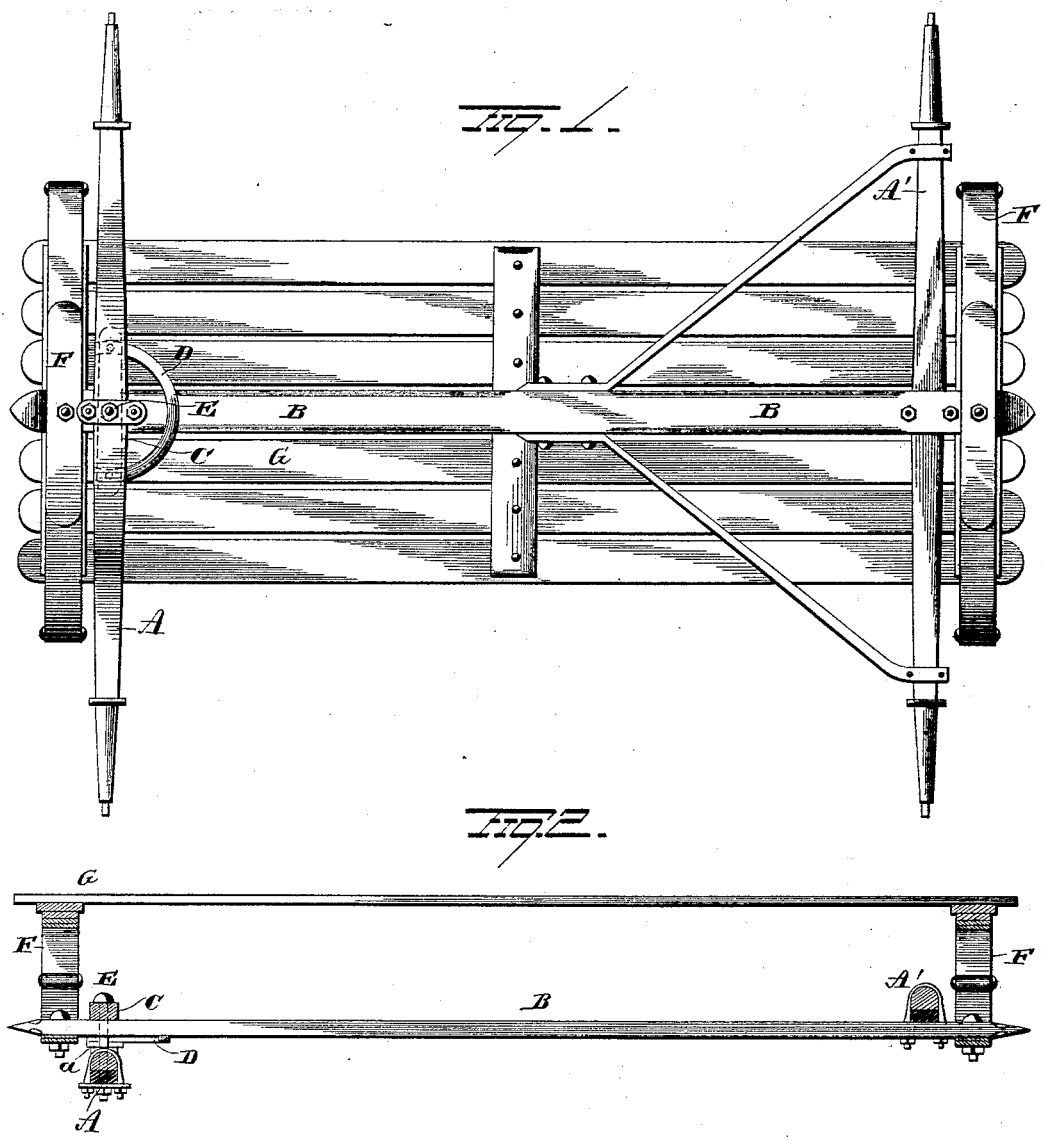

DANIEL ARNOLD SPRAGUE, OF POLAND, NEW YORK.

VEHICLE RUNNING-GEAR.

SPECIFICATION forming part of Letters Patent No. 348,642, dated September 7, 1886.

Application filed May 6, 1886. Serial No. 201,363. (No model.)

*To all whom it may concern:*

Be it known that I, DANIEL ARNOLD SPRAGUE, of Poland, in the county of Herkimer and State of New York, have invented certain new and useful Improvements in Running-Gear for Vehicles; and I do hereby declare the following to be a full, clear, and exact description of the invention, such as will enable others skilled in the art to which it appertains to make and use the same.

My invention relates to an improvement in running-gear for vehicles.

The object is to provide a neat, strong, convenient, and durable vehicle which may be constructed at a reduced cost.

With these ends in view my invention consists in a running-gear in which the springs are attached directly to the reach or reaches at points quite near the axles, and either in front or back of the axle.

My invention further consists in certain features of construction and combinations of parts, as will be hereinafter described, and pointed out in the claims.

In the accompanying drawings, Figure 1 is a bottom plan view of the gear, and Fig. 2 is a vertical longitudinal section through the center.

A represents the front axle, and A' the rear axle. A reach, B, consisting of a single bar, or it may consist of two or more bars, is secured to the under side of the rear axle and to a short cross-head, C, located over the front axle, and having the upper section, D, of the fifth-wheel secured to its under side. The king-bolt E passes through the cross-head C, reach-bar B, and axle A, and the axle A turns on it, as is usual. The axle A may be provided with bearing-plates at the points *a*, where the fifth-wheel section D engages it, or it may have a lower fifth-wheel section secured thereto, as is common. The rear axle is preferably straight and the front axle curved downwardly at the middle, in order that the approved difference in the diameters of the rear and front wheels may not be more than compensated for by placing the reach below the rear axle and above the front axle, as shown. The ends of the reach bar or bars extend a short distance to the front of the front axle and to the rear of the rear axle.

A pair of springs, F, either elliptical, as shown, or semi-elliptical, or of any other approved form, are secured to the under side of the reach bar or bars, one in front of the front axle and one to the rear of the rear axle.

The reach bar or bars are straight, or nearly so, and by securing the springs to the under side of the reach the center of gravity of the body G is brought as low as possible with respect to the points of support and at the same time admit of a free compression and expansion of the springs. The rolling motion of the body is thus avoided to a great extent, while the straight reach employed may be provided at a less cost than bent reaches, and serves to more directly connect and steady the axles.

The springs F might be attached to the reach close to the rear of the front axle and front of the rear axle, or they might be attached either both in front of their respective axles or both in the rear of their axles, the gist of my invention being the attachment of the springs in close proximity to the axles, either in front or rear of the same, and the attachment of the springs to the under side of a straight reach bar or bars, to bring the center of gravity of the load nearer the point of support. This construction is particularly applicable to the buck-board style of wagon, as it prevents almost entirely the continuous humming sound or muffled rattle which has hitherto proved so annoying.

I am aware that it is not broadly new to attach springs directly to the reach; but heretofore the reach has commonly been bent to lower the springs, and the springs have been attached quite a distance from the axles to escape the bend in the reach, and have been in the way of cramping the wheel, and have not been so located as to hold the body steady.

Having fully described my invention, what I claim as new, and desire to secure by Letters Patent, is—

1. In running-gear for vehicles, the combination, with one or more reach-bars secured below the rear axle and above the front axle, of body-supporting springs secured to the reach bar or bars in front of the front axle and in the rear of the rear axle, respectively, substantially as set forth.

2. In running-gear for vehicles, the combination, with one or more straight reach-bars, of a pair of body-supporting springs secured to the under side of the reach bar or bars, one in front of the front axle and the other to the rear of the rear axle, substantially as set forth.

3. In running-gear for vehicles, the straight reach-bar projecting to the front and rear of the front and rear axles, the cross-head and fifth-wheel section attached thereto, and the springs secured to the under sides of the projecting ends of the reach, the whole constructed and arranged substantially as set forth.

In testimony whereof I have signed this specification in the presence of two subscribing witnesses.

DANIEL ARNOLD SPRAGUE.

Witnesses:
J. T. WOOSTER,
DANIEL P. WOOSTER.